United States Patent [19]

Hay

[11] 3,959,156

[45] *May 25, 1976

[54] FABRIC SOFTENER

[75] Inventor: Peter M. Hay, Summit, N.J.

[73] Assignee: Sandoz, Inc., E. Hanover, N.J.

[ * ] Notice: The portion of the term of this patent subsequent to May 11, 1993, has been disclaimed.

[22] Filed: Sept. 16, 1974

[21] Appl. No.: 506,232

Related U.S. Application Data

[63] Continuation-in-part of Ser. No. 422,535, Dec. 6, 1973, abandoned.

[52] U.S. Cl. .............................. 252/8.8; 252/8.1; 260/403; 428/245; 428/265; 428/267
[51] Int. Cl.$^2$ ...................................... D06M 13/26
[58] Field of Search ............. 252/8.8, 8.1, 45.9 NP, 252/DIG. 24; 117/136, 139.5 F

[56] References Cited

UNITED STATES PATENTS

| 2,149,527 | 3/1939 | Kartaschoff et al. | 260/404.5 |
| 2,340,881 | 2/1944 | Kelley et al. | 252/8.8 |
| 2,541,101 | 2/1951 | Robimette et al. | 252/8.8 |
| 2,662,834 | 12/1953 | Paist et al. | 117/136 X |
| 3,046,297 | 7/1962 | Overbeek et al. | 252/8.1 X |
| 3,660,582 | 5/1972 | DiPietro et al. | 260/45.9 NP |
| 3,719,547 | 3/1973 | Martin et al. | 161/191 |
| 3,719,597 | 3/1973 | Wegerhoff et al. | 252/8.8 |

FOREIGN PATENTS OR APPLICATIONS

| 570,583 | 2/1959 | Canada |
| 1,487,570 | 7/1967 | France |
| 1,534,719 | 8/1968 | France |

OTHER PUBLICATIONS

Rayner, et al., Chemical Abstracts, Vol. 64, 16,133b, (1966).

Mayer, et al., Chemical Abstracts, Vol. 76, 60,868, (1972).

Barton, et al., Chemical Abstracts, Vol. 76, 128,618a, (1972).

Primary Examiner—John C. Bleutge
Assistant Examiner—W. C. Danison, Jr.
Attorney, Agent, or Firm—Gerald D. Sharkin; Richard E. Vila; Joseph J. Borovian

[57] ABSTRACT

Fabric softeners especially useful for treatment of synthetic fiber shag carpeting and also having anti-soiling and minimum flammability properties are provided by reacting a fatty acid or fatty ester amide-amine with tris-(2,3-dibromopropyl)-phosphate.

23 Claims, No Drawings

FABRIC SOFTENER

This application is a continuation-in-part of copending application Ser. No. 422,535, filed Dec. 6, 1973, now abandoned.

Substantial amounts of fabric softeners are consumed in the commercial manufacture and finishing of a host of textile products including those of synthetic and natural fibers, including carpet materials such as polyester shag carpeting. Certain of these softening agents, such as those referred to as fatty acid amide-amines, also impart anti-soiling properties but have the disadvantage of undesirably increasing the flammability of the fabric. Many of these softening agents such as the fatty acid amide-amines, also suffer from the disadvantage that they are not per se water dispersible and can only be rendered water dispersible by combining with other reagents, e.g., acetic acid, which in many cases serve no other useful purpose in the ultimate commercial processes in which such softening agents are applied to the fabric and which may further increase flammability.

An object of the present invention is to provide an improved softening agent for fabric.

Another object is to provide a softening agent embodying a fatty acid or fatty ester amide-amine derivative or moiety and having per se a water dispersing capability.

A further object of the invention is to provide a water dispersible fatty acid or fatty ester amide-amine softening agent having reduced flammability.

In accordance with the present invention, water dispersible softening agents of reduced inflammability are provided by the product obtained on reacting (A) the compound of the formula I:

$(BrCH_2—CHBrCH_2O)_3PO$     (I)

with (B) the reaction product of (i) a fatty acid or an ester derivative thereof, wherein said fatty acid or ester derivative thereof is selected from the group consisting of:

a. a saturated fatty acid of 12 to 22 carbon atoms, or a mixture thereof, b. a lower alkyl ($C_1$–$C_4$) or glycerol ester of a saturated fatty acid of 12 to 22 carbon atoms, or a mixture thereof, c. a mixture of at least one saturated fatty acid of 12 to 22 carbon atoms with one or more monounsaturated fatty acids of 14 to 22 carbon atoms, said mixture containing not more than 75% by weight of monounsaturated fatty acids, d. a mixture of at least one lower alkyl ($C_1$–$C_4$) or glycerol ester of a saturated fatty acid of 12 to 22 carbon atoms with one or more lower alkyl ($C_1$–$C_4$) or glycerol esters of monounsaturated fatty acids of 14 to 22 carbon atoms, said mixture containing not more than 75% by weight of esters of monounsaturated fatty acids, and e. mixtures thereof, and (ii) a diamine or mixture of diamines of the formula II:

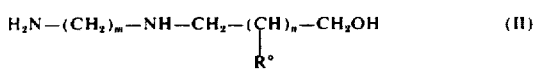

$H_2N—(CH_2)_m—NH—CH_2—(CH)_n—CH_2OH$     (II)
$\quad\quad\quad\quad\quad\quad\quad\quad\quad\quad\quad\quad |$
$\quad\quad\quad\quad\quad\quad\quad\quad\quad\quad\quad\quad R°$ wherein $m$ is 2 or 3, $n$ is 0 or 1, and $R°$ is hydrogen or hydroxy, the mol ratio of the fatty acid expressed as the fatty acyl radical to the compound II being in the range of from 1:1 to 3:1, preferably 1:1 to 2:1, and the mol ratio of the ester derivative expressed as the fatty acyl radical to the compound II being in the range of from 1:1 to 3:1, preferably 2:1 to 3:1; and the weight ratio of reactant B to reactant A being in the range of from 10:1 to 1.4:1.

The reaction of the compound I (reactant A) with the reaction product of the fatty acid or ester derivative thereof and compound II (reactant B) may be carried out over a fairly wide range of temperatures of from about 30° to 150°C., preferably 40° to 130°C. The reaction may be carried out in the presence or absence of added solvents and is preferably carried out in the absence of added solvents, e.g., in the melt or in aqueous suspension, at temperatures more preferably in the range of from 50° to 120°C., desirably between 60° to 100°C. When carried out in the presence of a solvent, the solvent may be any of several conventional organic types providing an inert medium. Examples of such solvents include toluene, perchloroethylene, acetone and the like. The reaction is carried out with the application of shearing forces suitable to intimately admix the reactants, e.g., in a mixing vessel. The reaction time is not particularly important and will vary depending upon a number of factors such as the presence or absence of a solvent, the weight ratio of reactant B to reactant A, and the mol ratio of the fatty acid or ester derivative thereof, expressed as the fatty acyl radical to compound II used in preparing reactant B. In general, the reaction may be substantially completed in as little as 2 minutes or may be extended for 12 or more hours. As a practical matter, reaction times are usually in the range of from about 4 minutes to 2 hours, more usually 5 to 60 minutes. Under the more preferred conditions for forming the more preferred products of the invention in absence of added solvent, the reaction time usually varies between 8 to 25 minutes. In general, it is desirable to regulate time and temperature to form the desired product without causing any substantial discoloration of the product. The reaction may be effected above or below normal atmospheric pressure, but is conveniently and preferably effected at about normal atmospheric pressure. The reaction products prepared in the absence of a solvent may be recovered directly essentially without further treatment while the added solvents may, if desired, be readily removed by conventional procedures.

The reactant B employed in producing the products of this invention are a class of products which are generally well known in the art and thus their preparation by conventional procedures is similarly well known. In general, such reactions are carried out at temperatures in the range of from 100° to 250°C., more usually 125° to 220°C., and preferably between 140° to 220°C. The reaction is usually carried out substantially in the absence of added solvents although various conventional solvents of known type may be employed. While the reaction may be conducted at atmospheric pressure, it is generally desirable to carry out the reaction at subatmospheric pressure at least during those periods when the water or alcohol produced by the condensation is being removed from the reaction mixture. Air and other oxygen containing gases are generally substantially excluded from the reaction area to avoid discoloration of the product and the use of reduced pressures constitutes a convenient procedure whereby the removal of water and the exclusion of air may be facilitated. Pressures ranging from about 0.5 atmosphere down to about 0.006 atmosphere are thus typically employed. Reaction time may vary fairly widely depending upon the particular starting materials, the ratio in which they are employed and the particular product which is desired. The reaction time will usually be in the range of from 2 hours to 48 hours, more usually from 3 to 20 hours, preferably 5 to 15 hours. In general, the reaction is carried out at least for a time sufficient to produce the amount of water or alcohol theoretically indicated by the fatty acid or fatty ester amide-forming condensation reaction, and thereafter up to 48 hours, preferably no more than 20 hours, as may be desired. The typically preferred reaction commences at about 100° to 125°C. under moderately reduced pressures and the temperature increased up to about 220°C. while the pressure is decreased to remove water or alcohol over a total reaction time of 3 to 20 hours, the reaction being conducted in the range of 140° to 220°C. for between 5 to 15 hours and the total reaction time more preferably being from 5 to 15 hours.

Some of the more readily available saturated and monounsaturated fatty acids for preparing reactant B are lauric, myristic, palmitic, stearic, behenic, oleic, ricinoleic, linoleic, linolenic, and mixtures thereof. In addition, fatty acids or mixtures of such acids that occur in various fats and oils, such as coconut oil, tallow, hydrogenated tallow, castor oil, hydrogenated castor oil, etc. may be used. However, the preferred embodiment of the invention involves the use of fatty acids containing little or no monounsaturated acids, and more especially, the saturated acids of 16 to 18 carbon atoms and mixtures thereof.

Among the more readily available lower alkyl esters or glycerol esters of saturated and monounsaturated fatty acids are methyl laurate, ethyl myristate, methyl stearate, ethyl oleate, glycerol tristearate, glycerol monooleate, and fatty triglycerides such as hydrogenated tallow glyceride, hydrogenated marine triglyceride, hydrogenated animal fat, hydrogenated vegetable oil, hydrogenated sperm oil and hydrogenated castor oil. However, the preferred esters for use in the invention are the fatty triglycerides, more preferably, hydrogenated tallow glyceride.

The exact nature of the product produced by the reaction of the fatty acid or ester derivative thereof with compound II, or mixtures thereof, has not been precisely determined. It is generally my view, shared by others in this art, that the reaction product is predominantly a mixture of at least two and usually all three of the compounds of the formulae III-A, III-B and III-C:

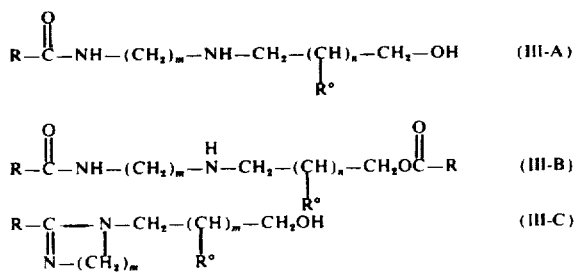

wherein R is the hydrocarbon residue of a fatty acid or ester derivative thereof, and R°, m and n are as defined. More specifically, such reaction products are viewed as generally containing compounds of the formulae III-A and III-B, and usually some proportion of the compound III-C; but the exact composition of the products including the relative proportions in the individual products which are present and the exact identity and/or presence of the compound assigned the formula III-C are not subject to precise determination. However, from the formulae III-A, III-B and III-C, it can be seen that the primary product of the reaction should be the compound of the formula III-A and that the products of the formula III-B largely depend upon the relative proportion in which the fatty acid or ester derivative thereof and compound II are reacted while the products of the formula III-C largely depend upon the length and/or severity of the reaction for at least some period after the theoretical amount of water or alcohol for the fatty acid or fatty ester amide-forming condensation reaction has been produced.

The preferred fatty acid or ester derivative amine-amides for use in the present invention are those which are obtained in accordance with one or more of the following specific conditions: (1) the use of commercial stearic acid as the fatty acid component; (2) the use of a fatty triglyceride as the fatty ester component; (3) the use of monohydroxyethylethylenediamine as the diamine; (4) the reaction of the fatty acid and diamine in a mol ratio of from 1.5:1 to 1.85:1; and (5) the reaction of the fatty ester and polyamine in a mol ratio of 2.0:1 to 2.8:1. The more preferred fatty acid amine-amides are those obtained on the reaction of palmitic/stearic acid mixtures containing 25% to 70% by weight of stearic acid with monohydroxyethylethylenediamine in a mol ratio of from 1.5:1 to 1.85:1 and substantially in the absence of added solvents at temperatures regulated within the range of from 140° to 220°C. for a time of from 5 to 15 hours in a substantially oxygen-free atmosphere with a pressure of from 0.5 to 0.006 atmosphere being applied during the reaction for a time sufficient to remove substantially all of the water generated and avoid any substantial discoloration of the product. The more preferred fatty ester amine-amides are those obtained by the reaction of hydrogenated tallow glyceride with monohydroxyethylethylenediamine in a mol ratio of 2.0:1 to 2.8:1 at temperatures regulated within the range of 140° to 200°C. for a time of from 4 to 12 hours at sub-atmospheric pressure in a substantially oxygen-free atmosphere. The resulting preferred fatty acid amine-amide products are believed to contain significant proportions of all of the above-referred compounds of the formulae III-A, III-B and III-C and are available commercially, for example, from Sandoz-Wander, Inc. under the trade designation CHEMICAL 39 BASE. In general, the products produced on reacting the fatty acid or ester derivative thereof with a compound of the formula II, or on reaction of mixtures of said compounds, may be used as such in preparing the softeners of the invention without separation of any of the products or by-products of the reaction (with the general exception of the water or alcohol produced) so long as the reaction is carried out as generally specified herein and so long as all or substantially all of the diamine has been reacted.

Since the exact nature of the reactant B is not precisely known, it will be evident that the products provided by the present invention are even more difficult to precisely determine. The products of the present invention are believed to be at least predominantly salts formed on reaction of the secondary and/or tertiary nitrogen atoms in the fatty acid or fatty ester derivatives with the bromoalkyl moieties in the compound I. The conclusion that the products are salts is supported by the chemical nature of the starting materials, the apparent lack of by-product formation and the improved water dispersibility of the products. However, the various reaction possibilities and the apparently complex nature of the products leave the precise nature of the products of the invention unknown. The preferred softening agents of the present invention, in addition to being preferably derived from the preferred and more preferred fatty acid or fatty ester amine-amide derivatives above-indicated, are generally those which are obtained on the reaction of the fatty acid or fatty ester amine-amide derivative reaction product (dry weight) and the compound of the formula I in a weight ratio of from 3:1 to 1.5:1, more preferably of from 2.6:1 to 1.6:1. While a weight ratio of 10:1 generally produces a softening agent which can be dispersed in water and which has reduced flammability, the weight ratios not in excess 3:1, more preferably in the range of 2.6:1 to 1.6:1, are usually required in order to impart self-extinguishing properties to the product. Weight ratios which are less than 1.4:1 are generally undesirable as tending increasingly to substantially depreciate the properties which are desired in a softening agent. The particularly preferred products of the present invention are obtained by reacting the compound of the formula I (reactant A) with a fatty acid amine-amide reaction product (reactant B) produced by reacting an approximately equal weight mixture of palmitic and stearic acid with monohydroxyethylethylenediamine in a mol ratio of from 1.5:1 to 1.85:1 at a temperature regulated within the range of from 140° to 220°C. for from 5 to 15 hours and at a pressure regulated within the range of 0.5 to 0.006 atmosphere during the reaction for a time sufficient to remove water generated by the condensation and avoid any substantial discoloration of the product, the reactant B and the reactant A being reacted at a weight ratio in the range of from 3:1 to 1.5:1, more preferably 2.6:1 to 1.6:1, at a temperature regulated within the range of from 60° to 100°C. for a time of from 5 to 60 minutes, more preferably from 8 to 25 minutes. The softening agents provided by the invention are typically waxy solids which can be broken up and readily dispersed with mixing in hot water (ca. 70°C.). The dispersions are generally slightly acidic, e.g., have a pH in the range of 3.5 to 6.5, more usually 4.0 to 6.0 As a practical matter, the water dispersibility and the stability of the dispersions are improved by the addition of minor quantities of water-soluble, organic surfactants which, in general, may be any of several well known types. In general, such surfactants may be combined with the softening agents of the invention in amounts which are between 1.0% and 20% based on the weight of the softening agent, more usually in an amount between 5.0% and 15% based on the weight of the softening agent. The especially preferred surfactants are the non-ionic surfactants and more especially those derived from condensing an aliphatic alcohol having from 8 to 22 carbon atoms with an alkylene oxide of 2 to 4 carbon atoms. The particular surfactant to be selected may depend upon a number of factors including the particular softening agent under consideration and the influence of the surfactant on various properties of the resulting dispersions. For example, it was found that the use of from 5.0 to 15% of an ethoxylated linear alcohol prepared by condensing a $C_{16}$ to $C_{18}$ alcohol or mixture thereof with 15 to 35 mols of ethylene oxide, such as that obtainable commercially under the trademark designation EKALINE G FLAKES (Sandoz-Wander, Inc.), performed somewhat better in the more preferred products of the invention than did IGEPAL CO-880 which tended to result in some discoloration and a product of reduced sulfate stability. The surfactants may be combined by conventional procedures with the softening agent of the invention after preparation of the softening agent. However, since many of the surfactants are more or less solid materials, it has been found convenient and preferred to incorporate the surfactant directly into the mixture in which the softening agents of the invention are produced, such surfactants being incorporated into such mixtures in an amount of from 1.0% to 20.0%, preferably 5.0% to 15.0%, by total weight of the reactant A and reactant B in said mixture. The more preferred surfactants are, therefore, those which are relatively stable and inert under the conditions under which the softening agents of the invention are produced.

The products of the invention can be adapted for storage and sale in different forms. A solid form can be readily produced by the reaction of reactant A and reactant B, preferably in the presence of a surfactant. On the other hand, liquid forms constituting aqueous dispersions containing typically 3.0% to 40%, more usually 5.0% to 30%, by weight of the reaction product of the invention may also be made available. The fluidity of such dispersions containing the larger amounts of the reaction product of the invention may be readily adjusted to the desired level by the addition of any of several known agents suitable for this purpose and selected primarily for efficiency in relation to the particular product and compatibility in the ultimate purpose for which it will be employed. For example, small quantities of isopropanol constituting approximately 0.5% to 5.0% by weight based on the total weight of the reaction product and water in the dispersion may be employed to produce products for use by those wishing to apply softening agents to dyed carpet materials. While the dispersions may be readily prepared from the reaction products of the invention, it has been found convenient and preferred to produce such dispersions during the formation of the reaction product by forming the reaction products of the invention in an aqueous suspension medium which may also contain viscosity stabilizing agents such as the isopropanol, methanol, ethanol, acetone, ethylene glycol and the like, and also, if desired, the surfactant which may be desired in the final product. When prepared in this manner the reaction product becomes dispersed in the water as it is formed and the resulting dispersion may be recovered, stored and sold substantially without further processing.

The reaction products of the present invention may be employed as softening agents for a variety of vegetable, animal or synthetic fibers or a mixture thereof, for instance wool, cotton, jute, silk, regenerated cellulose, acetate rayon, or a polyamide, polyester, polyolefin, polyvinylidene chloride or polyacrylic fiber, or a mixture of a vegetable and/or synthetic fiber with wool. The fiber assembly may be, for instance, a pile yarn or fabric made from such fibers or fiber mixtures, for example, rugs, tufted carpets, other carpeting materials, upholstery, curtains, and "flock", bonded or printed materials. The reaction products may be applied using conventional techniques employed in the application of known softening agents; these products also provide good anti-soiling properties.

The following examples are provided for purposes of illustration only. In the examples, parts and percentages are by weight unless otherwise indicated.

EXAMPLE 1

A charge of 66.6 parts of a palmitic/stearic acid amine amide obtained under the trade designation Chemical 39 Base and 33.3 parts of tris-(2,3-dibromopropyl)phosphate is heated in a mixing tank at 70°C. for 15 minutes. The resulting clear melt is cast into trays and cooled to obtain a waxy solid which can be readily broken up. This product is readily dispersible in hot water (ca. 70°C.) and does not burn in a candle test in which a lighted match is repeatedly applied to the wick of a small candle (3 cm. diameter) made from the melted reaction product and a strand of asbestos yarn saturated with the melted softener, the results being evaluated both with respect to the wick and the candle body in this test.

EXAMPLE 2

A charge of 60 parts of Chemical 39 Base and 10 parts of an ethoxylated linear alcohol obtainable under the trademark EKALINE G FLAKES is melted in a mixing tank at 70°C. and there is then added 30 parts of tris-(2,3-dibromopropyl)phosphate. The resulting mass is stirred at 70°–80°C. for 15 minutes and the resulting clear melt is cast into trays and cooled to obtain a waxy solid which can be readily broken up. This product is readily dispersible in hot water and does not burn (neither wick nor candle body) in the Candle test.

EXAMPLE 3

A charge of 70 parts of Chemical 39 Base and 30 parts of tris-(2,3-dibromopropyl)phosphate is reacted as in Example 1. The product is dispersible in hot water and neither the wick nor the candle body burns in the Candle test.

EXAMPLE 4

A charge of 75 parts of Chemical 39 Base of 25 parts of tris-(2,3-dibromopropyl)phosphate is reacted as in Example 1. The product is dispersible in hot water and the wick burns only briefly while the candle body does burn in the Candle test.

EXAMPLE 5

A charge of 80 parts of Chemical 39 Base and 20 parts of tris-(2,3-dibromopropyl)phosphate is reacted as in Example 1. The product is dispersible in hot water and the wick burns while the candle body burns only briefly in the Candle test.

EXAMPLE 6

A charge of 90 parts of Chemical 39 Base and 10 parts of tris-(2,3-dibromopropyl)phosphate is reacted as in Example 1. The product is dispersible in hot water and the wick burns while the candle body burns only briefly in the Candle test.

If 95 parts of Chemical 39 Base and 5 parts of the tris-(2,3-dibromopropyl)phosphate are reacted as in Example 1, the product results in burning of both the wick and candle body in the Candle test.

EXAMPLE 7

A charge of 78.9 parts of water, 1.1 parts of 91% isopropanol and 2.0 parts of EKALINE G FLAKES is mixed in a mixing tank at 50°C. until a clear solution is obtained. There is then added 6 parts of tris-(2,3-dibromopropyl)phosphate and the resulting mass stirred for 15 minutes at 50°C. There is then added 12 parts of Chemical 39 Base and the resulting mass is stirred at 70°–80°C. for 15 minutes to obtain an aqueous dispersion which is cooled to 60°C. and led into storage drums. The dispersion can be used in the softening of textiles, e.g., polyester textiles, and imparts excellent softening and anti-soiling properties with essentially the same inherent flame-resistant properties of the products of Examples 1 to 2.

EXAMPLE 8

A charge of 240 parts of stearic acid and 50 parts of monohydroxyethylaminopropyleneamine (mol ratio of fatty acyl radical to amine of 2:1) is heated under reduced pressure with stirring for 13 hours at a temperature which is slowly increased from 110° to 210°C. and which is in the range of about 150° to 200°C. for about 10.5 hours. Pressure is slowly decreased during the reaction from an initial pressure of about 0.7 atmosphere to a final pressure of about 0.02 atmosphere. The resulting cooled waxy product in the amount of 100 parts is charged to a mixing tank along with 15 parts of EKALINE G FLAKES and the resulting mass melted at a temperature of 75°C. There is then added 50 parts of tris-(2,3-dibromopropyl)phosphate and the resulting mass is stirred at 75°–80°C. for 15 minutes. The resulting melt is cast into trays and cooled to obtain a waxy solid which is readily dispersed in hot water and which does not burn (neither wick nor candle) in the Candle test.

EXAMPLE 9

A charge of 235 parts of palmitic acid and 45 parts of monohydroxyethylethylenediamine (mol ratio of fatty acyl radical to amine of 2:1) is heated under reduced pressure with stirring for 12 hours at a temperature which slowly increases from 110° to 210°C. and which is in the range of about 150° to 200°C. for about 10 hours. Pressure is slowly decreased during the reaction from an initial pressure of about 0.7 atmosphere to a final pressure of about 0.02 atmosphere. The resulting cooled waxy product in the amount of 100 parts is charged to a mixing tank along with 14 parts of EKALINE G FLAKES and the resulting mass melted at a temperature of 70°C. There is then added 50 parts of tris-(2,3-dibromopropyl)phosphate and the resulting mass is stirred at 70°–75°C. for 14 minutes. The resulting melt is cast into trays and cooled to obtain a waxy solid which is readily dispersed in hot water and which does not burn (neither wick nor candle) in the Candle test.

EXAMPLE 10

A charge of 255 parts of arachidic acid and 45 parts of monohydroxyethylethylene-diamine (mol ratio of fatty acyl radical to amine of 1.9:1) is heated under reduced pressure with stirring for 14 hours at a temperature which slowly increases from 110° to 220°C. and which is in the range of about 160° to 210°C. for about 12 hours. Pressure is slowly decreased during the reaction from an initial pressure of about 0.7 atmosphere to a final pressure of about 0.02 atmosphere. The resulting cooled waxy product in the amount of 100 parts is charged to a mixing tank along with 15 parts of EKALINE G FLAKES and the resulting mass melted at a temperature of 80°C. There is then added 46 parts of tris-(2,3-dibromopropyl)phosphate and the resulting mass is stirred at 80°-85°C. for 14 minutes. The resulting melt is cast into trays and cooled to obtain a waxy solid wich is readily dispersed in hot water and which does not burn (neither wick nor candle) in the Candle test.

EXAMPLE 11

A charge of 245 parts of stearic acid and 60 parts of 2,3-dihydroxypropylaminoethyleneamine (mol ratio of fatty acyl radical to amine of 1.9:1) is heated under reduced pressure with stirring for 12.5 hours at a temperature which slowly increases from 110° to 200°C. and which is in the range of about 140° to 190°C. for about 10.5 hours. Pressure is slowly decreased during the reaction from an initial pressure of about 0.7 atmosphere to a final pressure of about 0.02 atmosphere. The resulting cooled waxy product in the amount of 100 parts is charged to a mixing tank along with 15 parts of EKALINE G FLAKES and the resulting mass melted at a temperature of 70°C. There is then added 50 parts of tris-(2,3-dibromopropyl)phosphate and the resulting mass is stirred at 70°-75°C. for 15 minutes. The resulting melt is cast into trays and cooled to obtain a waxy solid which is readily dispersed in hot water and which does not burn (neither wick nor candle) in the Candle test.

EXAMPLE 12

A charge of 295 parts of commercial tallow fatty acid containing 3.0% myristic acid, 27% palmitic acid, 16% stearic acid, 48% oleic acid, 5.5% linoleic acid and 0.5% linolenic acid and 75 parts of monohydroxyethylethylenediamine (mol ratio of fatty acyl radical to amine of 1.5:1) is heated under reduced pressure with stirring for 12 hours at a temperature which slowly increases from 100° to 210°C. and which is in the range of about 145° to 200°C. for about 10 hours. Pressure is slowly decreased during the reaction from an intial pressure of about 0.7 atmosphere to a final pressure of about 0.04 atmosphere. The resulting cooled waxy product in the amount of 100 parts is charged to a mixing tank along with 16 parts of EKALINE G FLAKES and the resulting mass is melted at a temperature of 65°C. There is then added 50 parts of tris-(2,3-dibromopropyl)phosphate and the resulting mass is stirred at 70°C. for 15 minutes. The resulting melt is cast into trays and cooled to obtain a waxy solid which is readily dispersed in hot water and which does not burn (neither wick nor candle) in the Candle test.

EXAMPLE 13

A charge of 500 parts of hydrogenated tallow glyceride and 72 parts of monohydroxyethylethylenediamine (mol ratio of fatty acyl radical to amine of 2.5:1) is heated under reduced pressure with stirring for 8 hours at a temperature which is slowly increased from 100° to 190°C. and which for a period of 6 hours is between 160° and 185°C. Pressure is slowly decreased during the reaction from an initial pressure of about 0.5 atmospheres to a final pressure of about 0.04 atmospheres. The resulting cooled waxy product in the amount of 60 parts is charged to a mixing tank along with 30 parts of tris-(2,3-dibromopropyl)phosphate and the resulting mass is stirred at 70°-75°C. for 15 minutes. The resulting clear melt is cast into trays and cooled to obtain a waxy solid which can be readily broken up. This product is readily dispersible in hot water and does not burn (neither wick nor candle body) in the Candle test.

APPLICATION EXAMPLE AP-1

The product of Example 7 is evaluated in comparison to other softeners using polyester shag carpet greige goods of relatively light weight (41 ounces per square yard), dyeing and softening it in a laboratory dye beck and backing nine-inch squares with a single light coating of a flame-retardant latex backing. Eight squares are prepared for each sample and subjected to the official U.S. Government "pill test". It had been found in many previous pill tests that only carpet which is of marginal flammability without softener could be used to determine the effect of a softener on flammability. When the construction is too heavy or dense even a heavy application of a flammable softener such as that obtainable under the trademark CERANINE HCA would not induce flammability. At the other end of the scale, a carpet which is too light in weight, or which has an inadequate amount of latex backing, often fails the pill test with no softener on it. Thus, a 41-ounce polyester shag is used in the test and the latex for the backing has the composition given in Table 1 and is thickened to correct viscosity by addition of 1% of thickener (Heveatex WX). The solids content of the latex is 66.5%.

TABLE I

| Latex Composition (Heveatex Corp. - N-3025) | |
|---|---|
| Component | Parts (Solids Basis) |
| SBR Resin | 100 |
| Whiting (CaCO$_3$) | 200 |
| Hydrated Alumina | 150 |

The thickened latex is applied evenly to the back of a nine-inch square of carpet by dispensing a weighed amount uniformly onto the back of the carpet square. In this way, sets of dyed but unsoftened carpet with various amounts of backing are made. When these are tested for flammability the results indicate that an intermediate amount of flammability is achieved with 37 grams dry weight per square, equivalent to 21 ounces per square yard. More carpet is prepared with various amounts of various softeners. All carpets are backed with 37 grams of latex solids per square. The pill test results, shown in Table 2, show that all softeners except that of Example 7 increase the flammability while that of Example 7 gives the same flammability as no softener. Table 2 also shows that the product of Example 7 gives almost as much softness as CERANINE PNS and more softness than CERANINE HCA while the product obtained under the Trademark Chemcoloft SFR produces practically no softness.

TABLE 2

Flammability of Softened Carpet

All Carpets Backed With 37 Grams Per 9" Square

| Softener | Softness Ranking | Softener Wt. % Solids | Pill Test Results Percent Failure |
|---|---|---|---|
| None | 5 | 0.00 | 25.0 |
| Example 7 | 2 | 1.00 | 25.0 |
| Chemcoloft SFR | 4 | 1.00 | 37.5 |
| CERANINE HCA | 3 | 0.75 | 50.0 |

TABLE 2-continued

Flammability of Softened Carpet

All Carpets Backed With 37 Grams Per 9" Square

| Softener | Softness Ranking | Softener Wt. % Solids | Pill Test Results Percent Failure |
|---|---|---|---|
| CERANINE PNS | 1 | 1.00 | 62.5 |

APPLICATION EXAMPLE AP-2

Anti-soiling tests are conducted on application of various softening agents to white, loop-pile polyester carpet. The carpet reflectance is measured on the Hunterlab D-25 meter using the "whiteness" scale. As the data in Table 3 show, the product of Example 2 gives a slightly darker carpet compared to CERANINE HCA but soils at a slower rate than Chemcoloft SFR, with the rate of soiling of all softening agents being considerably slower than the blank.

TABLE 3

Anti-Soiling - Corridor Test
Polyester Loop Pile

| | Whiteness, Percent (Hunterlab) | | | |
|---|---|---|---|---|
| | Blank | CERANINE HCA | Example 2 | Chemcoloft SFR |
| Original | 55.0 | 50.7 | 46.8 | 52.2 |
| One Week | 45.0 | 44.4 | 40.4 | 44.7 |
| Two Weeks | 37.1 | 40.2 | 38.6 | 39.6 |
| Three Weeks | 33.1 | 36.9 | 35.5 | 35.0 |
| | Percent Retention of Original Whiteness | | | |
| | Blank | CERANINE HCA | Example 2 | Chemcoloft SFR |
| Original | 100.0 | 100.0 | 100.0 | 100.0 |
| One Week | 81.8 | 88.0 | 86.5 | 85.7 |
| Two Weeks | 67.6 | 79.5 | 82.5 | 76.0 |
| Three Weeks | 60.2 | 73.0 | 76.0 | 67.0 |

Although certain preferred embodiments have been disclosed and described for purposes of illustration, it will be evident that various changes and modifications will occur to those skilled in the art without departing from the scope and spirit of the invention.

What is claimed is:

1. A textile softening agent produced by reacting (A) the phosphate compound of the formula:

with (B) the reaction product of (i) a fatty acid or an ester derivative thereof, wherein said fatty acid or ester derivative thereof is selected from the group consisting of:

a. a saturated fatty acid of 12 to 22 carbon atoms, or a mixture thereof,
b. a lower alkyl ($C_1$–$C_4$) or glycerol ester of a saturated fatty acid of 12 to 22 carbon atoms, or a mixture thereof,
c. a mixture of at least one saturated fatty acid of 12 to 22 carbon atoms with one or more monounsaturated fatty acids of 14 to 22 carbon atoms, said mixture containing not more than 75% by weight of monounsaturated fatty acids,
d. a mixture of at least one lower alkyl ($C_1$–$C_4$) or glycerol ester of a saturated fatty acid of 12 to 22 carbon atoms with one or more lower alkyl ($C_1$–$C_4$) or glycerol esters of monounsaturated fatty acids of 14 to 22 carbon atoms, said mixture containing not more than 75% by weight of esters of monounsaturated fatty acids, and
e. mixtures thereof, and (ii) a diamine or mixture of diamines of the formula:

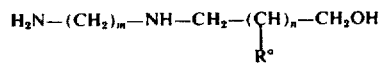

wherein $m$ is 2 or 3, $n$ is 0 or 1 and $R°$ is hydrogen or hydroxy; the mol ratio of the fatty acid or ester derivative thereof expressed as the fatty acyl radical to the diamine being in the range of 1:1 to 3:1, subject to the proviso that the reaction product (i) and (ii) is substantially free of unreacted diamine, said reaction product produced by the reaction of said fatty acid or ester derivative thereof and said diamine at a temperature between 100° and 250°C. for a time sufficient to produce substantially the entire amount of water or alcohol theoretically indicated by the fatty acid or fatty ester/amide-forming condensation reaction but not in excess of 48 hours, said reaction product and said phosphate compound being reacted in a weight ratio of from 10:1 to 1.4:1 at a temperature between 30° and 150°C.

2. A softening agent in accordance with claim 1 wherein said fatty acid component is selected from the group consisting of (a) a saturated fatty acid of 12 to 22 carbon atoms, (b) a mixture of at least one saturated fatty acid of 12 to 22 carbon atoms with one or more monounsaturated fatty acids of 14 to 22 carbon atoms, said mixture containing not more than 75% by weight of monounsaturated fatty acids, and (c) mixtures thereof, said reaction product produced by the reaction of said fatty acid and diamine in a mol ratio of 1:1 to 2:1.

3. A softening agent in accordance with claim 1 wherein said fatty acid component is a saturated fatty acid of 12 to 22 carbon atoms or a mixture thereof.

4. A softening agent in accordance with claim 1 in which the reaction product and phosphate compound are reacted in a weight ratio of from 3:1 to 1.5:1 and at a temperature of from 40° to 130°C.

5. A softening agent in accordance with claim 1 in which the diamine is monohydroxyethylethylenediamine.

6. A softening agent in accordance with claim 2 in which the reaction product is produced by the reaction of a fatty acid component and diamine in a mol ratio of from 1.5:1 to 1.85:1 at a temperature in the range of from 125° to 220°C. for a time of from 3 to 20 hours.

7. A softening agent in accordance with claim 1 in which the fatty acid component is a fatty acid of 16 to 18 carbon atoms or a mixture thereof.

8. A softening agent in accordance with claim 2 and produced by reacting the reaction product with the phosphate compound in a weight ratio of from 3:1 to 1.5:1 at a temperature of from 40° to 130°C. for from 5 to 60 minutes, said reaction product being produced by reacting a fatty acid which is a mixture of palmitic and stearic acids containing 25% to 75% by weight of stearic acid with monohydroxyethylethylenediamine in a mol ratio of from 1.5:1 to 1.85:1 at a temperature regulated within the range of from 125° to 220°C. for from 3 to 20 hours.

9. A softening agent in accordance with Claim 8 and produced by reacting the reaction product with the phosphate compound in a weight ratio of from 2.6:1 to 1.6:1.

10. A softening agent in accordance with claim 9 and produced by reacting the reaction product with the phosphate compound at a temperature of from 60° to 100°C. for from 8 to 25 minutes, said reaction product being produced by reacting the palmitic/stearic acid mixture and monohydroxyethylethylenediamine at a temperature regulated within the range of from 140° to 220°C. for from 5 to 15 hours.

11. A softening agent in accordance with claim 1 in which the reaction product is produced by the reaction of a fatty ester component and diamine in a mol ratio of 2.0:1 to 2.8:1 at a temperature in the range of from 125° to 220°C. for a time of from 3 to 20 hours.

12. A softening agent in accordance with claim 11 in which the reaction product is produced by the reaction of a fatty ester component and diamine in a mol ratio of 2.0:1 to 2.8:1 at a temperature between 140° and 200°C. for a time of from 4 to 12 hours, at sub-atmospheric pressure.

13. A softening agent in accordance with claim 11 wherein said fatty ester component is a glycerol ester of a mixture of saturated fatty acids of 12 to 22 carbon atoms and said diamine is monohydroxyethylethylenediamine.

14. A softening agent in accordance with claim 13 wherein said fatty ester component is hydrogenated tallow glyceride and said diamine is monohydroxyethylethylenediamine.

15. A softening agent in accordance with claim 8 and produced by reacting the reaction product and phosphate compound in the presence of from 1.0% to 20%, based on the weight of the softening agent, of a water-soluble, organic nonionic surfactant which is substantially inert in the reaction of said reaction product and phosphate compound.

16. A softening agent in accordance with claim 15 in which the reaction is carried out in the presence of from 5 to 15%, based on the weight of the softening agent, of an ethoxylated linear alcohol surfactant.

17. A softening agent in accordance with claim 8 in aqueous dispersed form and produced by reacting the reaction product and the phosphate compound in aqueous suspension, the total weight of said reaction product and phosphate compound constituting between 3% and 40% of the total weight of said reaction product, phosphate compound and water.

18. A softening agent in accordance with claim 17 and produced by reacting the reaction product and phosphate compound in the presence of from 1.0% to 20%, based on the weight of the softening agent, of a water-soluble, organic nonionic surfactant inert in the reaction of said reaction product and phosphate compound.

19. A softening agent in accordance with claim 11 and produced by reacting the reaction product and the phosphate compound in the presence of from 1.0% to 20%, based on the weight of the softening agent, of a water-soluble, organic nonionic surfactant which is substantially inert in the reaction of said reaction product and phosphate compound.

20. A softening agent in accordance with claim 19 in which the reaction is carried out in the presence of from 5 to 15%, based on the total weight of the softening agent, of an ethoxylated linear alcohol surfactant.

21. A softening agent in accordance with claim 11 in aqueous dispersed form and produced by reacting the reaction product and the phosphate compound in aqueous suspension, the total weight of said reaction product and phosphate compound constituting between 3% and 40% of the total weight of said reaction product, phosphate compound and water.

22. A softening agent in accordance with claim 21 and produced by reacting the reaction product and phosphate compound in the presence of from 1.0% to 20%, based on the weight of the softening agent, of a water-soluble, organic nonionic surfactant inert in the reaction of said reaction product and phosphate compound.

23. A textile softened with a softener of claim 1.

* * * * *